United States Patent
Toshioka et al.

(10) Patent No.: US 6,634,167 B1
(45) Date of Patent: Oct. 21, 2003

(54) EXHAUST TEMPERATURE RAISING APPARATUS AND METHOD FOR INTERNAL COMBUSTION ENGINE

(75) Inventors: Shunsuke Toshioka, Susono (JP); Shinya Hirota, Susono (JP); Takamitsu Asanuma, Susono (JP); Toshiaki Tanaka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 09/695,977

(22) Filed: Oct. 26, 2000

(30) Foreign Application Priority Data

Nov. 8, 1999 (JP) .......................................... 11-317338

(51) Int. Cl.[7] ................................................ F01N 3/00
(52) U.S. Cl. .............................. 60/284; 60/285; 60/286; 60/289; 60/301
(58) Field of Search .......................... 60/284, 285, 292, 60/289, 286, 301

(56) References Cited

U.S. PATENT DOCUMENTS

| | | | | |
|---|---|---|---|---|
| 3,247,665 A | * | 4/1966 | Behrens ...................... | 60/292 |
| 3,406,515 A | * | 10/1968 | Behrens ...................... | 60/274 |

(List continued on next page.)

FOREIGN PATENT DOCUMENTS

| | | | |
|---|---|---|---|
| DE | 003144706 A1 | * | 12/1982 |
| DE | 197 55 871 | | 6/1999 |
| DE | 199 14 787 | | 10/1999 |
| JP | (P) SHOU 49-80414 | | 8/1974 |
| JP | 54-145813 | * | 11/1979 |
| JP | 58-065923 | * | 4/1983 |
| JP | 58-162713 | * | 9/1983 |
| JP | 03-271515 | * | 12/1991 |
| JP | 3-271515 | | 12/1991 |
| JP | 4-111540 | | 4/1992 |
| JP | 5-44436 | | 2/1993 |
| JP | 05-044436 | * | 2/1993 |
| JP | 06-108884 | * | 4/1994 |
| JP | 6-108884 | | 4/1994 |
| JP | 8-296485 | | 4/1995 |
| JP | (P)08-74568 | | 3/1996 |
| JP | (P) 08-100638 | | 4/1996 |
| JP | 10-131792 | | 10/1996 |
| JP | (P) HEI 08-303290 | | 11/1996 |
| JP | 10-212995 | | 8/1998 |
| JP | 10-238336 | * | 9/1998 |

OTHER PUBLICATIONS

Translation of the Official Letter of Jun. 28, 2002, from the German Patent Office (in English), German Patent Application No. 100 55 098.3–26.

Copy of Office Action dated Mar. 17, 2003 in Application Ser. No. 09/959,672 and Notice of Refereces Cited.

Primary Examiner—Thomas Denion
Assistant Examiner—Diem Tran
(74) Attorney, Agent, or Firm—Kenyon & Kenyon

(57) ABSTRACT

An exhaust temperature raising apparatus for an internal combustion engine includes an exhaust throttle valve that adjusts an amount of flow of an exhaust gas flowing in an exhaust passage, a valve control device for controlling the exhaust throttle valve to a substantially completely closed state at a time when an amount of an unburned fuel component contained in the exhaust gas is to be reduced, an engine air-fuel ratio control device for operating the internal combustion engine at a theoretical air-fuel ratio or a fuel-excess air-fuel ratio when the exhaust throttle valve is controlled to the substantially completely closed state by the valve control device, and a secondary air supply device for supplying a secondary air to an upstream portion of the exhaust passage when the exhaust throttle valve is controlled to the substantially completely closed state by the valve control device.

7 Claims, 6 Drawing Sheets

U.S. PATENT DOCUMENTS

| | | | |
|---|---|---|---|
| 5,046,308 A | * | 9/1991 | Longobardi et al. .......... 60/311 |
| 5,934,072 A | * | 8/1999 | Hirota et al. ................. 60/301 |
| 6,014,859 A | * | 1/2000 | Yoshizaki et al. ............ 60/285 |
| 6,032,753 A | * | 3/2000 | Yamazaki et al. ......... 180/65.3 |
| 6,055,807 A | * | 5/2000 | Schatz et al. ................. 60/274 |
| 6,178,743 B1 | * | 1/2001 | Hirota et al. ................. 60/277 |
| 6,192,672 B1 | * | 2/2001 | Kerns .......................... 60/274 |

* cited by examiner

EXHAUST TEMPERATURE RAISING APPARATUS AND METHOD FOR INTERNAL COMBUSTION ENGINE

INCORPORATION BY REFERENCE

The disclosure of Japanese Patent Application No. 11-317338 filed on Nov. 8, 1999 including the specification, drawings and abstract is incorporated herein by reference in its entirety.

BACKGROUND OF THE INVENTION

1. Field of the Invention

The present invention relates to an art for raising the temperature of exhaust gas discharged from an internal combustion engine installed in a motor vehicle or the like and, more particularly, to an art for raising the exhaust gas temperature in order to lessen unburned fuel components contained in exhaust gas.

2. Description of the Related Art

With regard to late-model internal combustion engines installed in motor vehicles, it is required that harmful gas components contained in exhaust gas be removed or lessened before the exhaust gas is let out into the atmosphere. To meet this requirement, an art exists in which an emission control catalyst is disposed in an exhaust passage of an engine, and removes or lessens harmful gas components contained in exhaust gas.

Various emission control catalysts have been developed, for example, three-way catalysts, absorption-reduction type NOx catalysts, selective reduction type NOx catalysts, oxidative catalysts, and emission control catalysts combining suitable ones of the aforementioned, etc.

However, all the aforementioned emission control catalysts normally become activated and able to remove harmful gas components in exhaust gas at or above predetermined temperatures. Therefore, when the temperature of an emission control catalyst is lower than such a predetermined temperature, for example, at the time of a cold start of the engine, the emission control catalyst is unable to sufficiently lessen harmful gas components in exhaust gas.

Particularly, when the engine is cold-started, the combustion of an air-fuel mixture tends to be unstable due to the low temperature in the cylinders, so that a relatively large amount of unburned fuel components is discharged from the cylinders. If in such a case, the emission control catalyst is not activated, a relatively large amount of unburned fuel components is emitted into the atmosphere without being subjected to emission control processes.

Therefore, at the time of a cold start of an internal combustion engine, it is critical to quickly activate the emission control catalyst while curbing the amount of unburned fuel components emitted into the atmosphere. To meet this requirement according to the conventional art, a secondary air supply apparatus for an internal combustion engine as described in Japanese Patent Application Laid-Open No. HEI 8-74568 has been proposed.

When the emission control catalyst is in not activated, for example, at the time of a cold start of the engine, the secondary air supply apparatus supplies secondary air into an exhaust passage of the engine to achieve a fuel-lean exhaust air-fuel ratio, so that carbon monoxide (CO) and hydrocarbons (HCs) in exhaust gas are oxidized and substantially eliminated, and so that heat generated by the oxidizing reactions of carbon monoxide (CO) and hydrocarbons (HC) is used to achieve quick activation of the emission control catalyst.

However, since the atmosphere temperature in the exhaust passage is low at the time of a cold start of the engine, it is difficult to sufficiently oxidize and remove carbon monoxide (CO) and hydrocarbons (HCs) merely by achieving a lean exhaust air-fuel ratio through the addition of secondary air to exhaust gas. If the oxidizing reactions of carbon monoxide (CO) and hydrocarbons (HCs) are not sufficiently conducted, the amount of heat generated during the oxidizing reactions becomes small, so that achievement of early activation of the emission control catalyst becomes difficult.

SUMMARY OF THE INVENTION

Accordingly, it is an object of the invention to efficiently reduce the deterioration in exhaust emission quality at the time of a cold engine start in an exhaust temperature raising apparatus that raises the exhaust gas temperature while removing the unburned fuel components contained in exhaust gas by providing a technology capable of efficiently achieving the removal of unburned fuel components and raising the exhaust gas temperature.

An exhaust temperature raising apparatus for an internal combustion engine in accordance with an aspect of the invention includes an exhaust passage connected to the internal combustion engine, an exhaust throttle valve that is provided in the exhaust passage and that adjusts an amount of flow of an exhaust gas flowing in the exhaust passage, valve control means for controlling the exhaust throttle valve to a substantially completely closed state at a time when an amount of an unburned fuel component contained in the exhaust gas is to be reduced, engine air-fuel ratio control means for operating the internal combustion engine at a theoretical air-fuel ratio or a fuel-excess air-fuel ratio when the exhaust throttle valve is controlled to the substantially completely closed state by the valve control means, and secondary air supply means for supplying a secondary air to an upstream portion of the exhaust passage when the exhaust throttle valve is controlled to the substantially completely closed state by the valve control means.

In accordance with the internal combustion engine exhaust temperature raising apparatus constructed as described above, when it becomes necessary to reduce the amount of unburned fuel components contained in exhaust gas, the apparatus controls the exhaust throttle valve to the substantially completely closed state, and operates the internal combustion engine at the theoretical air-fuel ratio or a fuel-excess air-fuel ratio, and supplies secondary air into an upstream portion of the exhaust passage.

In this case, since the exhaust throttle valve is set to the substantially completely closed state, the pressure in the exhaust passage from the engine to the exhaust throttle valve is raised, and the flow rate of exhaust gas in the exhaust passage is reduced.

As the pressure in the exhaust passage rises, the atmospheric temperature in the exhaust passage correspondingly rises, so that the temperature decrease of exhaust gas discharged from the engine is reduced.

As a result, high-temperature exhaust gas resides immediately downstream of the engine for a long time. When under such a condition, secondary air is supplied to the exhaust gas, the unburned fuel components in the exhaust gas and oxygen in the secondary air are exposed to high temperatures for a long time, so that the reactions of unburned fuel components with oxygen are accelerated. As the reactions of unburned fuel components with oxygen become active, the amount of heat produced by the reactions increases, so that the temperature of exhaust gas further rises.

The exhaust pressure raised by controlling the exhaust throttle valve to the substantially completely closed state acts on the engine as a back pressure. In that case, however, since the engine is operated at the theoretical air-fuel ratio or a fuel-excess air-fuel ratio, the operation state of the engine does not become unstable.

In the above-described aspect, the time when the amount of unburned fuel components in exhaust gas is to be reduced is, for example, when a relatively large amount of unburned fuel components is discharged from the engine, such as a time when the engine is in a warm-up operation state following a cold start.

Furthermore, in the above-described aspect, if the internal combustion engine is a lean-burn direct-injection internal combustion engine that has fuel injection means for injecting a fuel directly into a cylinder and that is capable of switching between a stratified charge combustion operation and a homogeneous combustion operation, the engine air-fuel ratio control means may cause the homogeneous combustion operation of the internal combustion engine and may cause the fuel injection means to subsidiarily inject the fuel in addition to injection of a main amount of the fuel when the exhaust throttle valve is controlled to the substantially completely closed state by the valve control means so as to reduce the amount of unburned fuel components.

The reason why the homogeneous combustion operation of the engine is performed when the exhaust throttle valve is controlled to the substantially completely closed state is as follows. When the exhaust throttle valve is controlled to the substantially completely closed state, the back pressure acting on the engine rises. If the engine in the stratified charge combustion operation state in that case, the combustion state of the engine may possibly become unstable.

When the fuel injection valve subsidiarily injects fuel (subsidiary fuel), the subsidiary fuel and unburned fuel components, that is, leftover of the main fuel, are burned at high temperatures for a long time, so that the amount of unburned fuel components in exhaust gas is reliably reduced.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Specific embodiments of the exhaust temperature raising apparatus for an internal combustion engine of the invention will be described with reference to the accompanying drawings.

A first embodiment of the internal combustion engine exhaust temperature raising apparatus of the invention will be described with reference to FIGS. 1 to 3.

Figure 1:
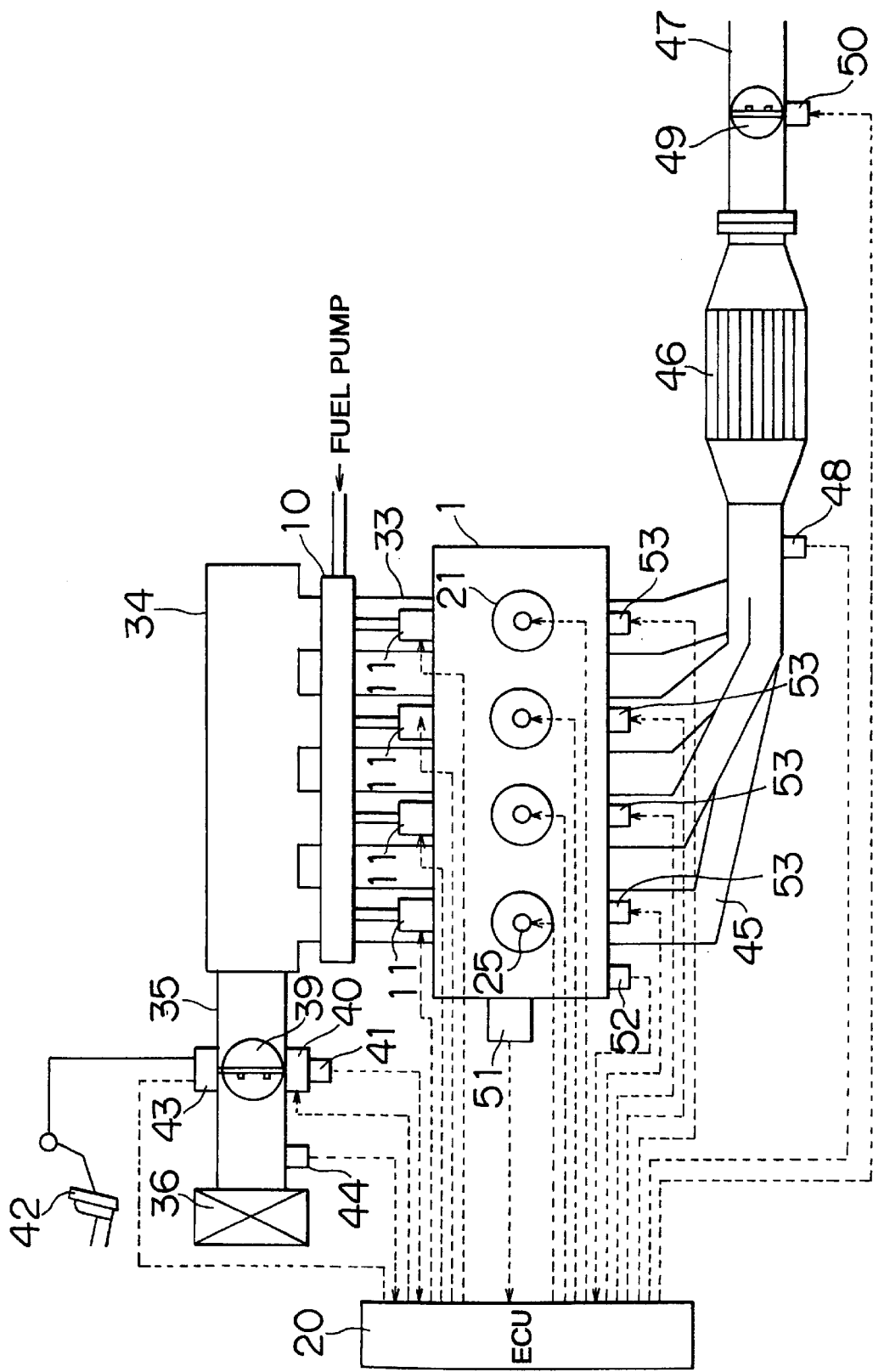
FIG. 1 is a schematic diagram illustrating an internal combustion engine to which an exhaust temperature raising apparatus according to a first embodiment of the invention is applied.

FIG. 1 is a schematic diagram of an internal combustion engine and its intake/exhaust system to which an exhaust temperature raising apparatus according to the first embodiment is applied.

An internal combustion engine 1 shown in FIG. 1 is a lean-burn engine capable of burning oxygen-excess mixtures. The engine 1 is a water-cooled 4-stroke gasoline engine having four cylinders 21.

The engine 1 has ignition plugs 25 that are mounted facing the combustion chambers of the corresponding cylinders 21. An intake manifold 33 and an exhaust manifold 45 are connected to the engine 1.

The branch pipes of the intake manifold 33 are connected to the corresponding cylinders 21 via intake ports (not shown) of the engine 1. The intake manifold 33 is connected to a surge tank 34. The surge tank 34 is connected to an air cleaner box 36 via an intake pipe 35.

The branch pipes of the intake manifold 33 are provided with fuel injection valves 11 that inject fuel toward the intake ports of the individual cylinders 21. Each fuel injection valve 11 is connected to a fuel distributor pipe 10. The fuel distributor pipe 10 is connected to a fuel pump (not shown).

The intake pipe 35 is provided with a throttle valve 39 for adjusting the amount of flow of fresh air in the intake pipe 35. The throttle valve 39 is provided with a throttle actuator 40 that is formed by a stepper motor or the like and that opens and closes the throttle valve 39 in accordance with the magnitude of applied current, and a throttle position sensor 41 that outputs an electric signal corresponding to the degree of opening of the throttle valve 39.

The throttle valve 39 is also provided with an accelerator lever (not shown) that is turned in association with an accelerator pedal 42. The accelerator lever is provided with an accelerator position sensor 43 that outputs an electric signal corresponding to the rotational position of the accelerator lever (i.e., the amount of depression of the accelerator pedal 42).

An air flow meter 44 that outputs an electric signal corresponding to the mass of fresh air flowing through the intake pipe 35 (intake air mass) is provided at a site in the intake pipe 35 upstream of the throttle valve 39.

The branch pipes of the exhaust manifold 45 are connected to the corresponding cylinders 21 via exhaust ports (not shown) of the engine 1. The engine 1 has secondary air injection nozzles 53 each of which is mounted so that the nozzle hole thereof faces a corresponding one of the exhaust ports of the cylinders. The secondary air injection nozzles 53 are connected to an air pump (not shown), and inject secondary air supplied from the air pump into the exhaust ports.

The exhaust manifold 45 is connected to an emission control catalyst device 46. The emission control catalyst device 46 is connected to an exhaust pipe 47 that is connected at its downstream side to a muffler (not shown).

The emission control catalyst device 46 is, for example, an absorption-reduction type NOx catalyst device that absorbs oxides of nitrogen (NOx) from exhaust gas when the air-fuel ratio of exhaust gas flowing into the emission control catalyst device 46 is on the fuel-lean side, and that releases absorbed nitrogen oxides (NOx) and reduces them into nitrogen ($N_2$) when the oxygen concentration in exhaust gas flowing into the emission control catalyst device 46 becomes low and a reducing agent is present (hereinafter, the emission control catalyst device 46 will be referred to as "absorption-reduction type NOx catalyst device 46").

The absorption-reduction type NOx catalyst device 46 is made up of a support in which channels that are open at upstream ends thereof and are closed at downstream ends thereof, and channels that are closed at upstream ends thereof and are open at downstream ends thereof are alternately arranged in a honeycomb form, and a NOx absorbent supported on wall surfaces of the individual channels.

The support is formed by, for example, a porous ceramic. The NOx absorbent may be made of, for example, a precious metal, such as platinum (Pt) or the like, and at least one species selected from the group consisting of alkali metals, such as potassium (K), sodium (Na), lithium (Li), cesium (Cs), etc., alkaline earths, such as barium (Ba), calcium (Ca), etc., and rare earths, such as lanthanum (La), yttrium (Y), etc. This embodiment will be described in conjunction with a NOx absorbent made of Ba and Pt.

The absorption-reduction type NOx catalyst device 46 formed as described above functions as follows. When the air-fuel ratio of exhaust gas flowing into the absorption-reduction type NOx catalyst device 46 shifts to the lean side and the oxygen concentration in exhaust gas becomes high, oxygen ($O_2$) in exhaust gas deposits on Pt surfaces of the NOx absorbent in the form of $O_2^-$ or $O^{2-}$. Subsequently, nitrogen monoxide (NO) in exhaust gas reacts with $O_2^-$ or $O^{2-}$ on the Pt surfaces to form nitrogen dioxide ($NO_2$).

The nitrogen dioxide ($NO_2$) binds with barium oxide (BaO) while being oxidized on the Pt surfaces, thereby forming nitrate ions ($NO_3^-$). Thus, oxides of nitrogen (NOx) in exhaust gas are absorbed in the form of $NO_{3-}$ into the NOx absorbent.

The NOx absorption continues, as long as the air-fuel ratio of exhaust gas flowing into the absorption-reduction type NOx catalyst device 46 is on the lean side and the NOx absorbing capability of the NOx absorbent is not saturated.

Conversely, when the oxygen concentration in exhaust gas flowing into the absorption-reduction type NOx catalyst device 46 becomes low, the quantity of nitrogen dioxide ($NO_2$) produced in the NOx absorbent decreases so that nitrate ions $NO_3^-$ bound with barium oxide (BaO) turn into nitrogen oxide ($NO_2$), thus desorbing from the NOx absorbent.

Thus, when the oxygen concentration in exhaust gas flowing into the absorption-reduction type NOx catalyst device 46 decreases, the oxides of nitrogen (NOx) absorbed in the NOx absorbent in the form of NO3– are turned into nitrogen dioxide ($NO_2$) and are released in that form from the NOx absorbent.

The oxides of nitrogen (NOx) released from the NOx absorbent are reduced into nitrogen ($N_2$) and the like through reactions with reducing components contained in exhaust gas (for example, active species, such as CO, HCs and the like partially oxidized through reactions with oxygen $O_2^-$ or oxygen $O^{2-}$ on Pt of the NOx absorbent). The oxides of nitrogen (NOx) are thus lessened.

Referring back to FIG. 1, the exhaust manifold 45 is provided with an air-fuel ratio sensor 48 that outputs an electric signal corresponding to the air-fuel ratio of exhaust gas flowing into the absorption-reduction type NOx catalyst device 46.

The air-fuel ratio sensor 48 is formed by, for example, a solid electrolyte portion formed in a tubular shape by sintering zirconia ($ZrO_2$), an outer platinum electrode covering an external surface of the solid electrolyte portion, and an inner platinum electrode covering an internal surface of the solid electrolyte portion. When a voltage is applied between the electrodes, the air-fuel ratio sensor 48 outputs a value of voltage proportional to the oxygen concentration in exhaust gas based on migration of oxygen ions (the concentration of unburned fuel components when the air-fuel ratio is on the rich side of the stoichiometric air-fuel ratio).

An exhaust throttle valve 49 that throttles the flow of exhaust gas in the exhaust pipe 47 is provided at a site in the exhaust pipe 47 downstream of the absorption-reduction type NOx catalyst device 46. The exhaust throttle valve 49 is provided with an exhaust throttle actuator 50 that is formed by a stepper motor or the like and that opens and closes the exhaust throttle valve 49 in accordance with the magnitude of applied electric power.

The engine 1 is equipped with a crank position sensor 51 that is formed by a timing rotor attached to an end portion of a crankshaft (not shown) and an electromagnetic pickup attached to a cylinder block of the engine 1. The crank position sensor 51 outputs a pulse signal every time the crankshaft turns a predetermined angle (e.g., 30 degrees).

The engine 1 is also equipped with a water temperature sensor 52 that outputs an electric signal corresponding to the temperature of cooling water flowing in a water jacket formed in the cylinder block and a cylinder head of the engine 1.

The engine 1 constructed as described above is equipped with an electronic control unit (ECU) 20 for controlling the engine 1. The ECU 20 is connected via electric wiring to various sensors, such as the throttle position sensor 41, the air flow meter 44, the air-fuel ratio sensor 48, the crank position sensor 51, the water temperature sensor 52, etc., so that output signals of the sensors are inputted to the ECU 20.

The ECU 20 is also connected via electric wiring to the fuel injection valves 11, the ignition plugs 25, the exhaust throttle actuator 50, the secondary air injection nozzles 53, etc., so that the ECU 20 can electrically control the fuel injection valves 11, the ignition plugs 25, the exhaust throttle actuator 50, the secondary air injection nozzles 53, etc.

Figure 2:
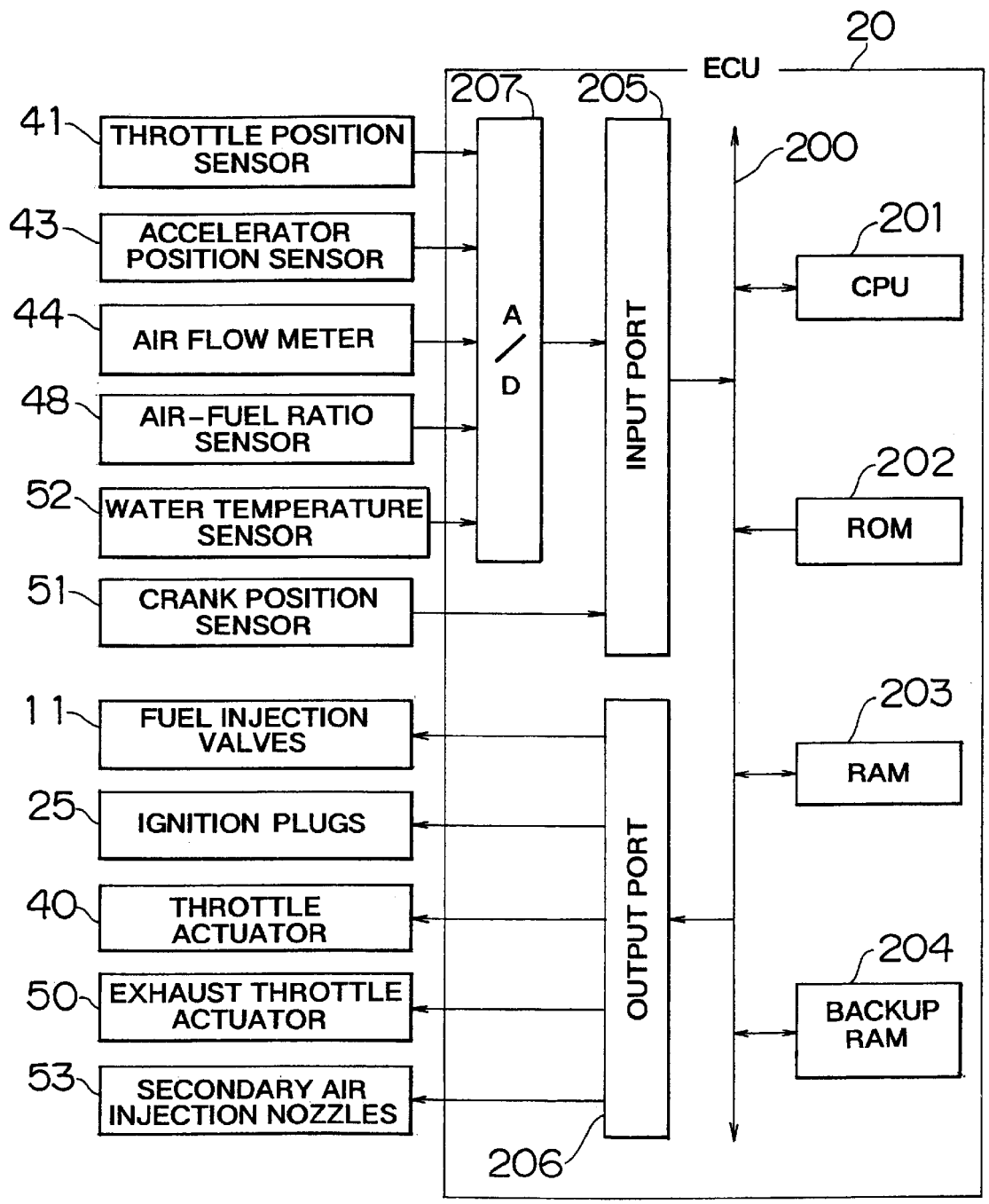
FIG. 2 is a diagram illustrating an internal construction of an ECU in the first embodiment.

As shown in FIG. 2, the ECU 20 has a CPU 201, a ROM 202, a RAM 203, a backup RAM 204, an input port 205, and an output port 206 that are interconnected via a bidirectional bus 200. The ECU 20 further includes an A/D converter (hereinafter, simply referred to as "A/D") 207 connected to the input port 205.

The input port 205 inputs signals outputted from sensors that output digital signal-form signals, such as the crank position sensor 51 and the like, and transmits the signals to the CPU 201 and the RAM 203.

The input port 205 inputs signals outputted from sensors that output analog signal-form signals, such as the throttle position sensor 41, the accelerator position sensor 43, the air flow meter 44, the air-fuel ratio sensor 48, the water temperature sensor 52, etc., via the A/D 207, and transmits the signals to the CPU 201 and the RAM 203.

The output port 206 is connected via electric wiring to the fuel injection valves 11, the ignition plugs 25, the throttle actuator 40, the exhaust throttle actuator 50, the secondary air injection nozzles 53, etc., and transmits control signals outputted from the CPU 201 to the fuel injection valves 11, the ignition plugs 25, the throttle actuator 40, the exhaust throttle actuator 50, the secondary air injection nozzles 53, or the like.

The ROM 202 stores an exhaust temperature raising control routine for raising the temperature of exhaust gas, in addition to various other application programs, such as a fuel injection amount control routine for determining an amount of fuel to be injected from the fuel injection valves 11, a fuel injection timing control routine for determining a timing at which fuel is to be injected from the fuel injection valves 11, an air-fuel ratio feedback control routine for controlling the air-fuel ratio feedback control of the amount of fuel injected, an ignition timing control routine for determining an ignition timing of the ignition plugs 25, a throttle control routine for controlling the degree of opening of the throttle valve 39, a NOx removal control routine for removing oxides of nitrogen (NOx) absorbed in the absorption-reduction type NOx catalyst device 46, etc. Besides the aforementioned application programs, the ROM 202 stores various control maps. The control maps are, for example, a fuel injection amount control map indicating a relationship between the operation state of the engine 1 and the amount of fuel injected, a fuel injection timing control map indicating a relationship between the operation state of the engine 1 and the fuel injection timing, an ignition timing control map indicating a relationship between the operation state of the engine 1 and the ignition timing, a throttle opening control map indicating the operation state of the engine 1 and the throttle valve 39, a NOx absorption amount control map indicating the operation state of the engine 1 and the amount of oxides of nitrogen (NOx) absorbed in the absorption-reduction type NOx catalyst device 46, etc.

The RAM 203 stores output signals of the various sensors, results of operations of the CPU 201, etc. The results of operations include, for example, an engine revolution speed calculated based on the output signal of the crank position sensor 51. The data regarding the engine revolution speed and the like is rewritten into latest data every time the crank position sensor 51 outputs a signal.

The backup RAM 204 is a non-volatile memory capable of storing data even after the engine 1 is stopped.

The CPU 201 operates in accordance with the application programs stored in the ROM 202, thereby executing the fuel injection control, the ignition control, the NOx removal control, etc., in addition to the exhaust temperature raising control, which is a gist of the invention.

During the operations, the CPU 201 determines an operation state of the engine 1 using the values of output signals of the crank position sensor 51, the accelerator position sensor 43, the air flow meter 44, or the like as parameters. In accordance with the determined operation state, the CPU 201 executes various controls.

For example, when the CPU 201 determines that the operation state of the engine 1 is in a low/intermediate load operation region, the CPU 201 controls the amount of fuel injection so as to cause an operation (lean-burn operation) of the engine 1 based on an oxygen-excess mixture (a mixture of a fuel-lean air-fuel ratio mixture).

When the CPU 201 determines that the operation state of the engine 1 is in a high-load operation state, the CPU 201 controls the amount of fuel injection so as to cause an operation (stoichiometric operation or rich operation) of the engine 1 based on a theoretical air-fuel ratio mixture or a fuel-excess mixture (rich air-fuel ratio mixture).

During the lean-burn operation of the engine 1, the air-fuel ratio of exhaust gas discharged from the engine 1 is on the fuel-lean side, so that oxides of nitrogen (NOx) contained in exhaust gas are absorbed into the absorption-reduction type NOx catalyst device 46. However, if the lean-burn operation of the engine 1 continues for a long time, there is a danger of saturation of the capability of the absorption-reduction type NOx catalyst device 46 for absorbing oxides of nitrogen (NOx). If that happens, oxides of nitrogen (NOx) in exhaust gas are not removed or eliminated by the absorption-reduction type NOx catalyst device 46, but are let out into the atmosphere.

Therefore, during the lean-burn operation of the engine 1, the CPU 201 executes the NOx removal control of releasing and reducing the oxides of nitrogen (NOx) absorbed in the absorption-reduction type NOx catalyst device 46 in short cycles by controlling the amount of fuel injection in such a manner that the stoichiometric operation or the fuel-rich operation of the engine 1 is carried out in a spike fashion (for a short time) in relatively short cycles.

That is, in the NOx removal control, the CPU 201 executes a generally termed lean/rich spike control, that is, controls the operation state of the engine 1 so that the exhaust air-fuel ratio (the air-fuel ratio of mixture in this embodiment) is alternately changed between the "lean" state and the "theoretical or rich air-fuel ratio in a spike fashion" state.

At a time when the amount of unburned fuel components (unburned HCs) contained in exhaust gas from the engine 1 is to be lessened, the CPU 201 executes the exhaust temperature raising control. Examples of the time when the amount of unburned fuel components contained in exhaust gas is to be reduced include a time when a relatively large amount of unburned HCs is discharged from the engine 1 and the absorption-reduction type NOx catalyst device 46 is not activated, such as a time when the engine 1 is in a warm-up operation state following a cold start.

In the exhaust temperature raising control, the CPU 201 first determines whether the absorption-reduction type NOx catalyst device 46 has been activated. Examples of the method of determining whether the absorption-reduction type NOx catalyst device 46 has been activated include a method in which a temperature sensor for detecting the catalyst bed temperature of the absorption-reduction type NOx catalyst device 46 is mounted on the absorption-reduction type NOx catalyst device 46 and, when the value of an output signal of the temperature sensor is higher than or equal to a predetermined activation temperature, it is determined that the absorption-reduction type NOx catalyst device 46 has been activated, a method in which the catalyst bed temperature of the absorption-reduction type NOx catalyst device 46 is estimated based on the operation history of the engine 1 and the like and, when the estimated value is higher than or equal to the predetermined activation temperature, it is determined that the absorption-reduction type NOx catalyst device 46 has been activated, etc.

If the CPU 201 determines that the absorption-reduction type NOx catalyst device 46 is not activated, the CPU 201 executes an exhaust temperature raising process so as to quickly activate the absorption-reduction type NOx catalyst device 46. If the CPU 201 determines that the absorption-reduction type NOx catalyst device 46 has been activated, the CPU 201 does not execute the exhaust temperature raising process.

In the exhaust temperature raising process, the CPU 201 controls the amount of fuel injection so as to cause the stoichiometric operation-or the rich operation of the engine 1, and operates the secondary air injection nozzles 53 to supply secondary air into the exhaust ports of the engine 1.

Thus, the secondary air injected from the secondary air injection nozzles 53 is supplied into exhaust gas discharged from the combustion chambers of the engine 1 into the exhaust ports. Since the secondary air injection nozzles 53 are disposed immediately downstream of the corresponding combustion chambers, the temperature of exhaust gas in the exhaust ports is relatively high. Upon supply of secondary air into such high-temperature exhaust gas, unburned HCs remaining in the exhaust gas react with oxygen from the secondary air, that is, the unburned HCs are substantially eliminated. Furthermore, heat produced during the reactions of unburned HCs and oxygen (reaction heat) raises the temperature of exhaust gas.

The exhaust gas heated by heat of the reactions between unburned HCs and oxygen flows from the exhaust ports into the absorption-reduction type NOx catalyst device 46 via the exhaust manifold 45, thereby transferring heat from exhaust gas to the absorption-reduction type NOx catalyst device 46.

It is to be noted herein that burned gas after combustion in the combustion chambers of the engine 1 is discharged into the exhaust ports undergoes a considerable pressure fall and a corresponding considerable temperature fall. Therefore, it is difficult to effectively react unburned HCs remaining in the burned gas with oxygen from the secondary air.

Furthermore, when the engine 1 is in the warm-up operation state following a cold start, the exhaust path from the combustion chambers of the engine 1 to the absorption-reduction type NOx catalyst device 46 (the exhaust ports and the exhaust manifold 45 in this embodiment) is at a lower temperature, so that heat is transferred from exhaust gas to the exhaust ports and the exhaust manifold 45. Therefore, there is a danger of a low temperature of the exhaust gas reaching the absorption-reduction type NOx catalyst device 46.

Therefore, in the exhaust temperature raising control in this embodiment, the CPU 201 causes the stoichiometric operation or the rich operation, and operates the secondary air injection nozzles 53, and then controls the exhaust throttle actuator 50 so as to set the exhaust throttle valve 49 to a substantially completely closed state.

When the exhaust throttle valve 49 is set to the substantially completely closed state, the pressure in the exhaust path from the combustion chambers of the engine 1 to the exhaust throttle valve 49 (the exhaust ports, the exhaust manifold 45, the absorption-reduction type NOx catalyst device 46, and a portion of the exhaust pipe 47 upstream of the exhaust throttle valve 49 in this embodiment) rises, and the atmospheric temperature in the aforementioned exhaust passage correspondingly rises.

When the pressure and the atmospheric temperature in the exhaust path from the combustion chambers to the exhaust throttle valve 49 have risen, the temperature decrease of burned gas occurring at the time of discharge from each combustion chamber into the exhaust port is reduced. Furthermore, when the exhaust throttle valve 49 is in the substantially completely closed state, the flow rate of exhaust gas in the exhaust passage from the exhaust ports to the exhaust throttle valve 49 decreases.

As a result, exhaust gas discharged from the combustion chambers of the engine 1 resides at a high temperature in the exhaust path from the combustion chambers to the exhaust throttle valve 49 for a long time, during which unburned HCs contained in the exhaust gas are oxidized.

It is preferred that the degree of opening of the exhaust throttle valve 49 during the exhaust temperature raising control be a degree of opening such that the back pressure caused by operation of the exhaust throttle valve 49 does not degrade the combustion state of the engine 1. For example, an optimal degree of opening of the exhaust throttle valve 49 in accordance with the operation state of the engine 1 may be empirically determined beforehand.

The operation and advantages of the exhaust temperature raising apparatus of the embodiment will be described below.

Figure 3:
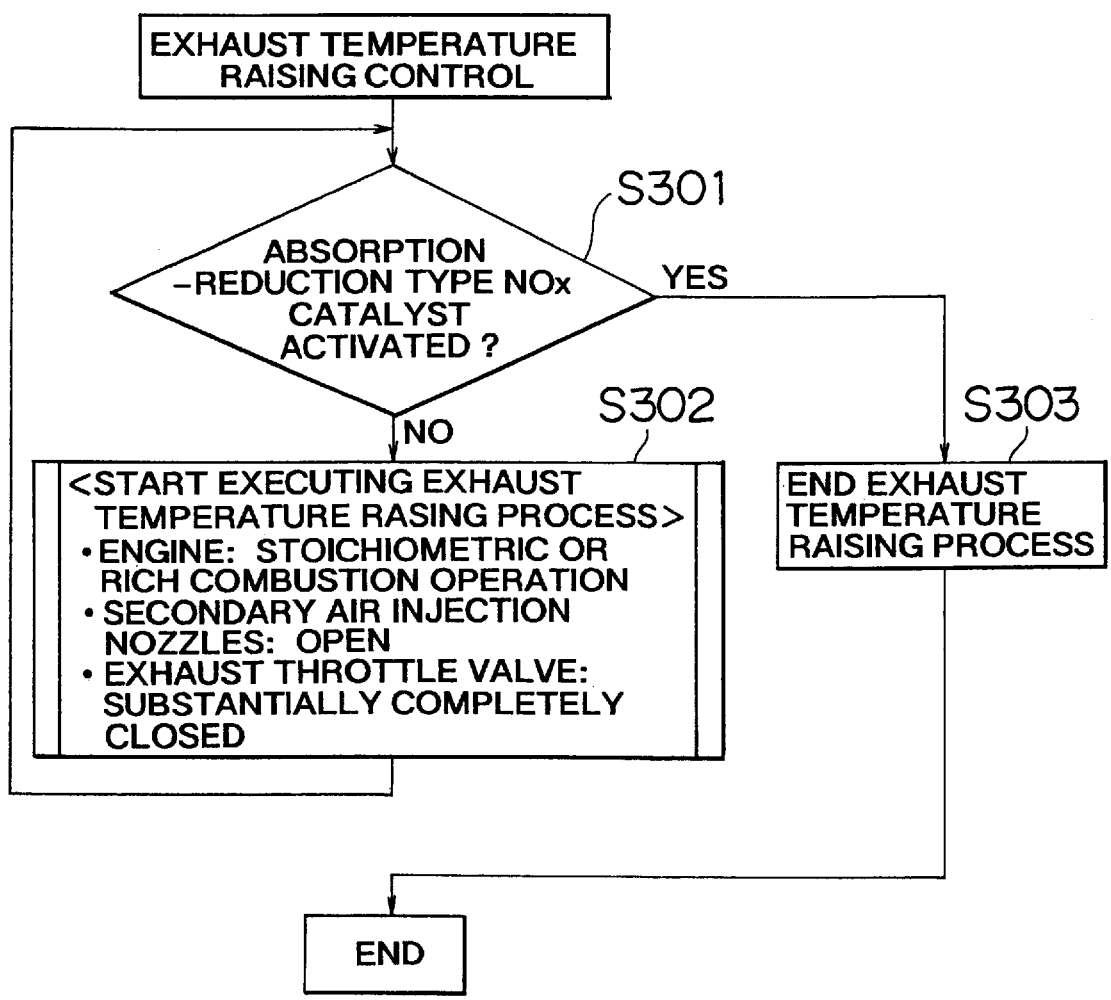
FIG. 3 is a flowchart illustrating an exhaust temperature raising control routine in the first embodiment.

To realize the exhaust temperature raising control, the CPU 201 executes an exhaust temperature raising control routine as illustrated in FIG. 3. This routine is pre-stored in the ROM 202. The execution of the routine is triggered by the completion of the starting of the engine 1.

In the exhaust temperature raising control routine, the CPU 201 first determines in step S301 whether the absorption-reduction type NOx catalyst device 46 is already activated.

If it is determined in step S301 that the absorption-reduction type NOx catalyst device 46 is not activated, the CPU 201 goes to S302, in which the CPU 201 starts executing the exhaust temperature raising process to reduce the amount of unburned HCs in exhaust gas and raise the temperature of exhaust gas.

More specifically, during the exhaust temperature raising process, the CPU 201 controls the amount of fuel injection so as to cause the rich combustion operation or the stoichiometric combustion operation of the engine 1, and controls the secondary air injection nozzles 53 so as to supply secondary air into the exhaust ports of the engine 1, and controls the exhaust throttle actuator 50 so as to set the exhaust throttle valve 49 to the substantially completely closed state.

Due to this process, the pressure and the atmospheric temperature in the exhaust path from the combustion chambers of the engine 1 to the exhaust throttle valve 49 rise, and the flow rate of exhaust gas in the exhaust passage decreases, so that the exhaust gas discharged from the combustion chambers of the engine 1 and the secondary air injected from the secondary air injection nozzles 53 reside at a high temperature in the exhaust path.

Therefore, since unburned HCs remaining in the exhaust gas and oxygen in the secondary air are exposed to high temperatures for a long time, the reactions of unburned HCs with oxygen are promoted, thus substantially eliminating the unburned HCs. Furthermore, heat produced by the reactions between unburned HCs and oxygen reliably raises the temperature of exhaust gas. When the temperature of exhaust gas is raised, heat is transferred from the exhaust gas to the absorption-reduction type NOx catalyst device 46, so that the absorption-reduction type NOx catalyst device 46 is quickly activated.

Furthermore, since the absorption-reduction type NOx catalyst device 46 is disposed upstream of the exhaust throttle valve 49, the absorption-reduction type NOx catalyst device 46 is exposed to high-temperature exhaust gas for a long time, so that the temperature raise of the absorption-reduction type NOx catalyst device 46 is further enhanced.

Referring back to FIG. 3, after executing the above-described processing of step S302, the ECU 20 returns to step S301, in which the CPU 201 determines whether the absorption-reduction type NOx catalyst device 46 has been activated.

If it is determined that the absorption-reduction type NOx catalyst device 46 is not activated yet, the CPU 201 continues the exhaust temperature raising process of step S302. Conversely, if it is determined in step S301 that the absorption-reduction type NOx catalyst device 46 has been activated, the CPU 201 proceeds to step S303, in which the CPU 201 ends the execution of the exhaust temperature raising process. Subsequently, the CPU 201 ends the execution of the routine.

Thus, the CPU 201 executing the exhaust temperature raising process routine controls the valve control means, engine air-fuel ratio control means, and secondary air supply means in the invention.

Therefore, the exhaust temperature raising apparatus of this embodiment is able to reliably reduce the amount of unburned HCs in exhaust gas and achieve quick activation of the absorption-reduction type NOx catalyst device 46 when a relatively large amount of unburned HCs is discharged from the engine 1 and the absorption-reduction type NOx catalyst device 46 is not activated.

A second embodiment of the internal combustion engine exhaust temperature raising apparatus of the invention will be described with reference to FIGS. 4 to 6, in which component elements substantially the same as those of the first embodiment are represented by the same reference numerals.

Figure 4:
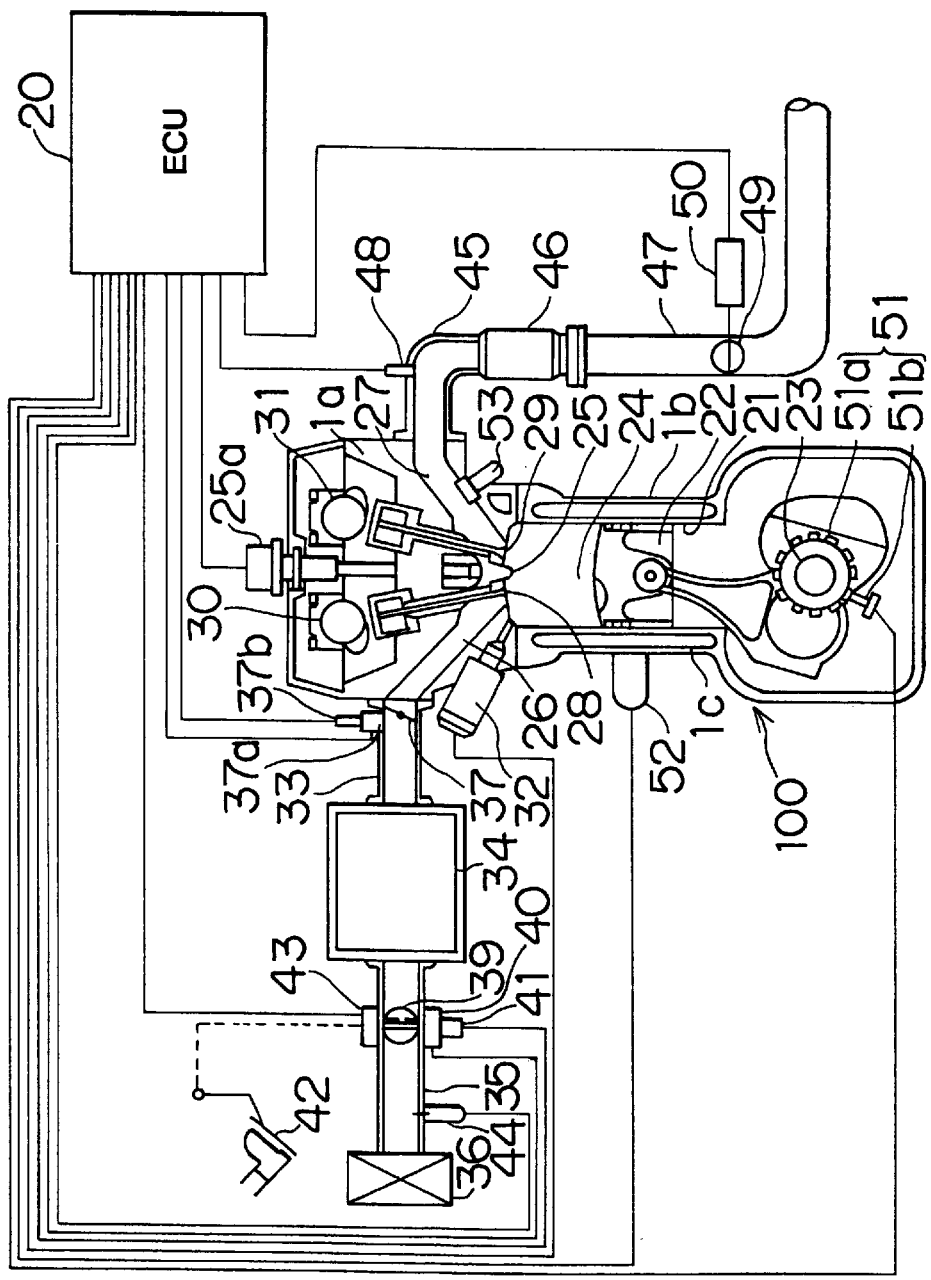
FIG. 4 is a schematic diagram illustrating an internal combustion engine to which an exhaust temperature raising apparatus according to a second embodiment of the invention is applied.

FIG. 4 is a schematic diagram illustrating a construction of an internal combustion engine to which an exhaust temperature raising apparatus according to the second embodiment is applied. An internal combustion engine 100 shown in FIG. 4 is a four-stroke direct fuel injection-type engine having a plurality of cylinders 21 and fuel injection valves 32 for injecting fuel into the individual cylinders 21.

The engine 100 has a cylinder block 1b in which the cylinders 21 and a cooling water channel 1c are formed, and a cylinder head 1a fixed to an upper portion of the cylinder block 1b.

The cylinder block 1b rotatably supports a crankshaft 23, that is, an engine output shaft. The crankshaft 23 is connected to pistons 22 that are disposed slidably in the corresponding cylinders 21.

Formed above each piston 22 is a combustion chamber 24 that is defined by a top surface of the piston 22 and a wall surface of the cylinder head 1a. Ignition plugs 25 are attached to the cylinder head 1a so that each ignition plug 25 faces the corresponding one of the combustion chambers 25. Each ignition plug 25 is connected to an igniter 25a that applies a drive current to the ignition plug 25.

Intake ports 26 and exhaust ports 27 are formed in the cylinder head 1a so that opening ends of two intake ports 26 and opening ends of two exhaust ports 27 face a corresponding one of the combustion chambers 24. The fuel injection valves 32 are attached to the cylinder head 1a so that a nozzle opening of each fuel injection valve 32 faces the corresponding one of the combustion chambers 24.

Secondary air injection nozzles 53 are mounted so that a nozzle hole thereof faces a corresponding one of the exhaust ports 27. The secondary air injection nozzles 53 are connected to an air pump (not shown), and inject secondary air supplied from the air pump into the exhaust ports.

The opening end of each intake port 26 is opened and closed by an intake valve 28 that is supported to the cylinder head 1a so that the intake valve 28 can be moved back and forth. The intake valves 28 are moved back and forth by an intake-side camshaft 30 that is rotatably supported to the cylinder head 1a.

The opening end of each exhaust port 27 is opened and closed by an exhaust valve 29 that is supported to the cylinder head 1a for back-and-forth movements. The exhaust valves 29 are moved back and forth by an exhaust-side camshaft 31 that is rotatably supported to the cylinder head 1a.

The intake-side camshaft 30 and the exhaust-side camshaft 31 are connected to the crankshaft 23 via a timing belt (not shown) so that torque is transmitted from the crankshaft 23 to the intake-side camshaft 30 and the exhaust-side camshaft 31 via the timing belt.

One of the two intake ports 26 connected in communication with each cylinder 21 is formed by a straight port that has a linear channel extending from an opening end of the intake port 26 on an external wall of the cylinder head 1a to an opening end thereof facing the combustion chamber 24. The other intake port 26 is formed by a helical port that has a channel which extends from an opening end of the intake port 26 on the external wall of the cylinder head 1a to an opening end thereof facing the combustion chamber 24 and which curves on a plane perpendicular to an axis of the cylinder 21.

Each intake port 26 is connected to a corresponding one of the branch pipes of an intake manifold 33 that is attached to the cylinder head 1a.

The branch pipe connected to the straight port of the two intake ports 26 of each cylinder 21 is provided with a swirl control valve 37 that adjusts the amount of flow in the branch pipe.

Each swirl control valve 37 is provided with an SCV actuator 37a that is formed by a stepper motor or the like and that opens and closes the swirl control valve 37 in accordance with the magnitude of applied current, and an SCV position sensor 37b that outputs an electric signal that corresponds to the degree of opening of the swirl control valve 37.

The intake manifold 33 is connected to a surge tank 34 for reducing pulsations of flow of intake air. The surge tank 34 is connected to an intake pipe 35. The intake pipe 35 is connected to an air cleaner 36 for removing dust and dirt from intake air.

The intake pipe 35 is provided with a throttle valve 39 for adjusting the amount of flow of fresh air in the intake pipe 35. The throttle valve 39 is provided with a throttle actuator 40 that is formed by a stepper motor or the like and that opens and closes the throttle valve 39 in accordance with the magnitude of applied current, and a throttle position sensor 41 that outputs an electric signal corresponding to the degree of opening of the throttle valve 39.

The throttle valve 39 is also provided with an accelerator lever (not shown) that is turned in association with an accelerator pedal 42. The accelerator level is provided with an accelerator position sensor 43 that outputs an electric signal corresponding to the rotational position of the accelerator lever (i.e., the amount of depression of the accelerator pedal 42).

Provided upstream of the intake pipe 35 is an air flow meter 44 that outputs an electric signal corresponding to the mass of fresh air flowing in the intake pipe 35 (intake air mass).

Each exhaust port 27 of the engine 100 is connected to a corresponding one of the branch pipes of an exhaust manifold 45 that is attached to the cylinder head 1a. The exhaust manifold 45 is connected to an exhaust pipe 47 via an absorption-reduction type NOx catalyst device 46. The exhaust pipe 47 is connected at its downstream end to a muffler (not shown).

The exhaust manifold 45 is provided with an air-fuel ratio sensor 48 that outputs an electric signal corresponding to the air-fuel ratio of exhaust gas flowing in the exhaust manifold 45.

An exhaust throttle valve 49 that throttles the flow of exhaust gas in the exhaust pipe 47 is provided in partway of the exhaust pipe 47. The exhaust throttle valve 49 is provided with an exhaust throttle actuator 50 that is formed by a stepper motor or the like and that opens and closes the exhaust throttle valve 49 in accordance with the magnitude of applied current.

The engine 100 is equipped with a crank position sensor 51 that is formed by a timing rotor 51a attached to an end portion of a crankshaft 23 and an electromagnetic pickup 51b attached to a portion of the cylinder block 1bnear the timing rotor 51a. The engine 100 is also equipped with a water temperature sensor 52 attached to the cylinder block 1b so as to detect the temperature of cooling water flowing in the water channel 1c formed in the engine 100.

The engine 100 constructed as described above is equipped with an electronic control unit (ECU) 20 for controlling the engine 100.

The ECU 20 is connected via electric wiring to various sensors, such as the SCV position sensors 37b, the throttle position sensor 41, the accelerator position sensor 43, the air flow meter 44, the air-fuel ratio sensor 48, the crank position sensor 51, the water temperature sensor 52, etc., so that output signals of the sensors are inputted to the ECU 20.

The ECU 20 is also connected via electric wiring to the igniters 25a, the fuel injection valves 32, the SCV actuators 37a, the throttle actuator 40, the exhaust throttle actuator 50, the secondary air injection nozzles 53, etc., so that the ECU 20 can control the igniters 25a, the fuel injection valves 32, the SCV actuators 37a, the throttle actuator 40, the exhaust throttle actuator 50, the secondary air injection nozzles 53 by using the values of output signals of the various sensors as parameters.

Figure 5:
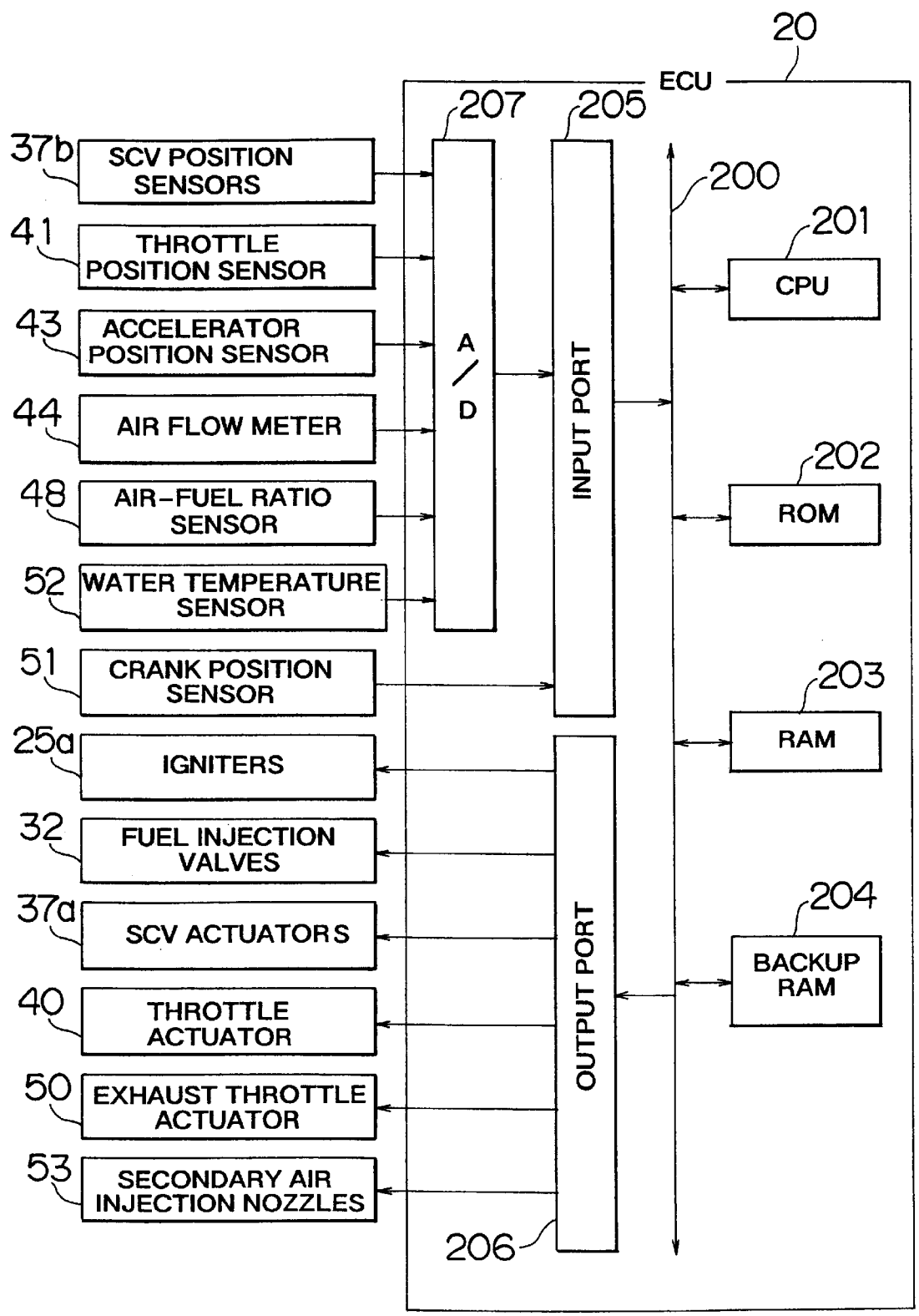
FIG. 5 is a diagram illustrating an internal construction of an ECU in the second embodiment.

As shown in FIG. 5, the ECU 20 has a CPU 201, a ROM 202, a RAM 203, a backup RAM 204, an input port 205, and an output port 206 that are interconnected via a bidirectional bus 200. The ECU 20 further includes an A/D converter (hereinafter, simply referred to as "A/D") 207 connected to the input port 205.

The input port 205 inputs signals outputted from sensors that output digital signal-form signals, such as the crank position sensor 51 and the like, and transmits the signals to the CPU 201 and the RAM 203.

The input port 205 inputs signals outputted from sensors that output analog signal-form signals, such as the SCV position sensors 37b, the throttle position sensor 41, the accelerator position sensor 43, the air flow meter 44, the air-fuel ratio sensor 48, the water temperature sensor 52, etc., via the A/D 207, and transmits the signals to the CPU 201 and the RAM 203.

The output port 206 transmits control signals outputted from the CPU 201 to the igniters 25a, the fuel injection valves 32, the SCV actuators 37a, the throttle actuator 40, the exhaust throttle actuator 50, the secondary air injection nozzles 53, or the like.

The ROM 202 stores an exhaust temperature raising control routine for raising the temperature of exhaust gas, in addition to various other application programs, such as a fuel injection amount control routine for determining an amount of fuel to be injected, a fuel injection timing control routine for determining a fuel injection timing, an ignition timing control routine for determining an ignition timing of the ignition plugs 25, a throttle control routine for controlling the degree of opening of the throttle valve 39, a NOx removal control routine for removing oxides of nitrogen (NOx) absorbed in the absorption-reduction type NOx catalyst device 46, etc.

Besides the aforementioned application programs, the ROM 202 stores various control maps. The control maps are, for example, a fuel injection amount control map indicating a relationship between the operation state of the engine 100 and the amount of fuel injected, a fuel injection timing control map indicating a relationship between the operation state of the engine 100 and the fuel injection timing, an ignition timing control map indicating a relationship between the operation state of the engine 100 and the ignition timing, an SCV opening control map indicating a relationship between the operation state of the engine 100 and a swirl control valve (SCV) 37, a throttle opening control map indicating the operation state of the engine 100 and the throttle valve 39, a NOx absorption amount control map indicating the operation state of the engine 100 and the amount of oxides of nitrogen (NOx) absorbed in the absorption-reduction type NOx catalyst device 46, etc.

The RAM 203 stores output signals of the various sensors, results of operations of the CPU 201, etc. The results of operations include, for example, an engine revolution speed calculated based on the output signal of the crank position sensor 51. The data regarding the results of operations stored in the RAM 203 is rewritten into latest data every time the crank position sensor 51 outputs a signal.

The backup RAM 204 is a non-volatile memory that retains data even after the engine 100 is stopped.

The CPU 201 operates in accordance with the application programs stored in the ROM 202, thereby executing the fuel injection control, the ignition control, the SCV control, the throttle control, the NOx removal control, the exhaust temperature raising control, etc.

During the operations, the CPU 201 determines an operation state of the engine 100 using the values of output signals of the crank position sensor 51, the accelerator position sensor 43, the air flow meter 44, or the like as parameters. In accordance with the determined operation state, the CPU 201 executes various controls.

For example, when the CPU 201 determines that the operation state of the engine 100 is in a low-load operation region, the CPU 201 operates so as to realize stratified charge combustion of an oxygen-excess mixture (fuel-lean mixture). That is, the CPU 201 reduces the degree of opening of the swirl control valves 37 by sending a control signal to the SCV actuators 37a, and sets the throttle valve 39 to a substantially fully open state by sending a control signal to the throttle actuator 40, and executes the compression-stroke injection by applying a drive signal to each fuel injection valve 32 during the compression stroke.

In this case, fresh air is introduced into the combustion chamber 24 of each cylinder 21 mainly through the helical intake port 26 during the intake stroke of the cylinder 21, so that whirling streams (swirls) occur in the combustion chamber 24. During the subsequent compression stroke, fuel is injected into the combustion chamber 24 from the fuel injection valve 32, and turns following the swirls, and moves to the vicinity of the ignition plug 25 at a predetermined timing. At this moment, a generally termed stratified state that a combustible mixture layer is formed in the vicinity of the ignition plug 25 in the combustion chamber 24 and an air layer is formed in the other region is established in the combustion chamber 24.

At the time when the stratified state is established in the combustion chamber 24 of the cylinder 21, the CPU 201 drives the igniter 25a to produce a spark from the ignition plug 25. As a result, the air-fuel mixture (including the combustible mixture layer and the air layer) in the combustion chamber 24 burns, with the combustible mixture layer adjacent to the ignition plug 25 serving as an ignition source.

The amount of fuel to be injected during the stratified charge combustion operation mode is determined by using the accelerator pedal depression amount and the engine revolution speed as parameters. More specifically, the CPU 201 determines an amount of fuel to be injected (or fuel injection duration) by using a map that indicates a relationship among the value of the output signal of the accelerator position sensor 43 (amount of depression of the accelerator pedal), the engine revolution speed, and the amount of fuel injected.

When the CPU 201 determines that the operation state of the engine 100 is in an intermediate load operation region, the CPU 201 operates so as to realize homogeneous combustion of a mixture of an approximately stoichiometric air-fuel ratio. That is, the CPU 201 reduces the degree of opening of the swirl control valves 37 by sending a control signal to the actuators 37a, and causes intake stroke fuel injection by applying the drive current to the fuel injection valve 32 of each cylinder 21 during the intake stroke of the cylinder 21.

In this case, fresh air and fuel homogeneously mix to provide a fuel-lean mixture substantially throughout the combustion chamber 24 of each cylinder 21, thereby realizing homogeneous lean combustion.

When the CPU 201 determines that the operation state of the engine 100 is in a high load operation region, the CPU 201 operates so as to achieve homogeneous combustion of a mixture of an approximately stoichiometric air-fuel ratio. That is, the CPU 201 sets the swirl control valves 37 to the fully open state by sending a control signal to the actuators 37a, and sends a control signal to the throttle actuator 40 such that the throttle valve 39 is set to an opening degree corresponding to the amount of depression of the accelerator pedal 42 (the value of the output signal of the accelerator position sensor 43), and causes intake stroke fuel injection by applying the drive current to the fuel injection valve 32 of each cylinder 21 during the intake stroke of the cylinder 21.

In this case, fresh air and fuel homogeneously mix to provide a substantially stoichiometric air-fuel ratio mixture substantially throughout the combustion chamber 24 of each cylinder 21, thereby achieving homogeneous combustion.

During the transition from the stratified charge combustion control to the homogeneous combustion control or during the transition from the homogeneous combustion control to the stratified charge combustion control, the CPU 201 may apply the drive current to the fuel injection valve 32 of each cylinder 21 twice, that is, applies the drive current separately during the compression stroke and during the intake stroke of the cylinder 21, in order to prevent fluctuations in the torque of the engine 100.

In this case, a combustible mixture layer is formed adjacent to the ignition plug 25 and a lean mixture layer is formed in the other region in the combustion chamber 24 of each cylinder 21, thus achieving generally-termed weak stratified charge combustion.

When the operation state of the engine 100 is in an idle operation region, the CPU 201 executes a generally-termed feedback idle speed control (ISC). That is, the CPU 201 controls the degree of opening of the throttle valve 39 so as to secure a flow of intake air that is needed to converge the actual engine revolution speed to a target idle speed.

When the engine 100 is in the stratified charge combustion operation state, the homogeneous lean combustion operation state, or the weak stratified charge combustion operation state, that is, when the engine 100 is in the lean burn operation state, the air-fuel ratio of exhaust gas discharged from the engine 100 is on the lean side, so that oxides of nitrogen (NOx) contained in exhaust gas are absorbed into the absorption-reduction type NOx catalyst device 46. However, if the lean-burn operation of the engine 100 continues for a long time, there is a danger of saturation of the capability of the absorption-reduction type NOx catalyst device 46 for absorbing oxides of nitrogen (NOx). If that happens, oxides of nitrogen (NOx) in exhaust gas are not removed or eliminated by the absorption-reduction type NOx catalyst device 46, but are let out into the atmosphere.

Therefore, in accordance with this embodiment, during the lean-burn operation state of the engine 100, the CPU 201 executes the NOx removal control of releasing and reducing the oxides of nitrogen (NOx) absorbed in the absorption-reduction type NOx catalyst device 46 in short cycles by executing a rich spike control to achieve a rich air-fuel ratio in relatively short cycles.

During the rich spike control, the CPU 201 may temporarily achieve a theoretical air-fuel ratio (or a rich-side air-fuel ratio) of exhaust gas through a subsidiary injection control of subsidiarily injecting fuel from the fuel injection valve of each cylinder 21 during the compression stroke or the exhaust stroke, or may temporarily achieve a theoretical air-fuel ratio (or a rich-side air-fuel ratio) of exhaust gas by temporarily switching the operation state of the engine 100 to the homogeneous combustion operation.

At a time when the amount of unburned fuel components (unburned HCs) contained in exhaust gas from the engine 100 is to be reduced, the CPU 201 executes the exhaust temperature raising control. Examples of the time when the amount of unburned fuel components contained in exhaust gas is to be reduced include a time when a relatively large amount of unburned HCs is discharged from the engine 100 and the absorption-reduction type NOx catalyst device 46 is not activated, such as a time when the engine 100 is in a warm-up operation state following a cold start.

In the exhaust temperature raising control, the CPU 201 first determines whether the absorption-reduction type NOx catalyst device 46 has been activated. If it is determined that the absorption-reduction type NOx catalyst device 46 is not activated, the CPU 201 executes the exhaust temperature raising process so as to achieve quick activation of the absorption-reduction type NOx catalyst device 46. If it is determined that the absorption-reduction type NOx catalyst device 46 has been activated, the CPU 201 does not execute the exhaust temperature raising process.

In the exhaust temperature raising process, the CPU 201 controls the fuel injection valves 32, the SCV actuators 37a, the throttle actuator 40, and the igniters 25a so as to achieve the homogeneous combustion operation state of the engine 100 based on a theoretical air-fuel ratio or a rich-side air-fuel ratio, also controls the exhaust throttle actuator 50 so as to set the exhaust throttle valve 49 to a substantially completely closed state.

When the exhaust throttle valve 49 is set to the substantially completely closed state, the pressure in the exhaust path from the combustion chambers 24 of the engine 100 to the exhaust throttle valve 49 (the exhaust ports, the exhaust manifold 45, the absorption-reduction type NOx catalyst device 46, and a portion of the exhaust pipe 47 located upstream of the exhaust throttle valve 49) rises, and the atmospheric temperature in the aforementioned exhaust passage correspondingly rises.

When the pressure and the atmospheric temperature in the exhaust path from the combustion chambers 24 to the exhaust throttle valve 49 have risen, the temperature decrease of burned gas occurring at the time of discharge from each combustion chamber 24 into the exhaust ports 27 is reduced. Furthermore, when the exhaust throttle valve 49 is in the substantially completely closed state, the flow rate of exhaust gas in the exhaust passage from the exhaust ports to the exhaust throttle valve 49 decreases.

As a result, exhaust gas discharged from the combustion chambers 24 resides at a high temperature in the exhaust path from the combustion chambers 24 to the exhaust throttle valve 49 for a long time, during which unburned HCs contained in the exhaust gas are oxidized.

Even when the exhaust throttle valve 49 is in the substantially completely closed state, there is a danger of insufficient oxidation of unburned HCs, for example, if the temperature of exhaust gas at the time of discharge from each combustion chamber 24 into the exhaust ports 27 is excessively low, or if the amount of unburned HCs contained in exhaust gas discharged from the combustion chamber 24 is excessively large.

Therefore, when the exhaust throttle valve 49 is to be controlled to the substantially completely closed state during the exhaust temperature raising control in this embodiment, the CPU 201 controls the fuel injection valves 32 so as to inject into each cylinder 21 a main amount of fuel that contributes to the engine output (main injection) and subsidiarily inject fuel at a predetermined timing after the main fuel injection (e.g., immediately after the main fuel combustion during the expansion stroke of each cylinder 21).

In this case, unburned HCs, that is, leftover of the main fuel, are burned with the subsidiary fuel serving as an ignition source. The sub-fuel injection is performed under a high-temperature condition immediately after the combustion of the main fuel, so that the subsidiary fuel substantially completely burns. Therefore, the amount of unburned HCs attributed to the subsidiary fuel injection is very small.

As the subsidiary fuel is burned in each combustion chamber 24 as described above, subsidiary fuel combustion heat and unburned HCs combustion heat are produced in addition to the main fuel combustion heat, so that the temperature of burned gas in the combustion chambers 24 is further raised.

As a result, the temperature of exhaust gas discharged from the combustion chambers 24 into the exhaust ports 27 becomes sufficiently high, and the amount of unburned HCs remaining in exhaust gas decreases. The unburned HCs remaining in exhaust gas is exposed to high temperatures in the exhaust path from the combustion chambers 24 to the exhaust throttle valve 49 for a long time, during which the unburned HCs are substantially entirely oxidized.

Furthermore, in this embodiment, the emission control catalyst device 46 is disposed in the exhaust passage upstream of the exhaust throttle valve 49. Therefore, when the exhaust temperature is raised as described above, the emission control catalyst device 46 is exposed to high-temperature exhaust gas for a long time, so that the activation of the emission control catalyst device 46 is promoted.

In order to oxidize the unburned HCs remaining in exhaust gas in the exhaust path from the combustion chambers 24 to the exhaust throttle valve 49, it is necessary that a sufficient amount of oxygen exist in the exhaust gas. To meet this need, it is conceivable to employ a method for increasing the oxygen concentration in exhaust gas by causing the stratified charge combustion operation of the engine 100. However, when the exhaust throttle valve 49 is held in the substantially completely closed state, the back pressure acting on the engine 100 becomes high. Therefore, if in that case, the engine 100 is operated in the stratified charge combustion mode, the operation state of the engine 100 may become unstable.

In this embodiment, therefore, during execution of the exhaust temperature raising control, the CPU 201 causes the homogeneous combustion operation of the engine 100 based on a mixture of the theoretical air-fuel ratio or a rich-side air-fuel ratio, and operates the secondary air injection nozzles 53 so as to increase the oxygen concentration in exhaust gas.

Due to the homogeneous operation of the engine 100, the operation state of the engine 100 is unlikely to become unstable even when the exhaust throttle valve 49 is controlled to the substantially completely closed state. Furthermore, since the secondary air is supplied from the secondary air injection nozzles 53 into the exhaust ports 27, it becomes possible to secure an amount of oxygen that is needed to oxidize the unburned HCs remaining in exhaust gas.

The operation and advantages of the exhaust temperature raising apparatus of this embodiment will be described below.

Figure 6:
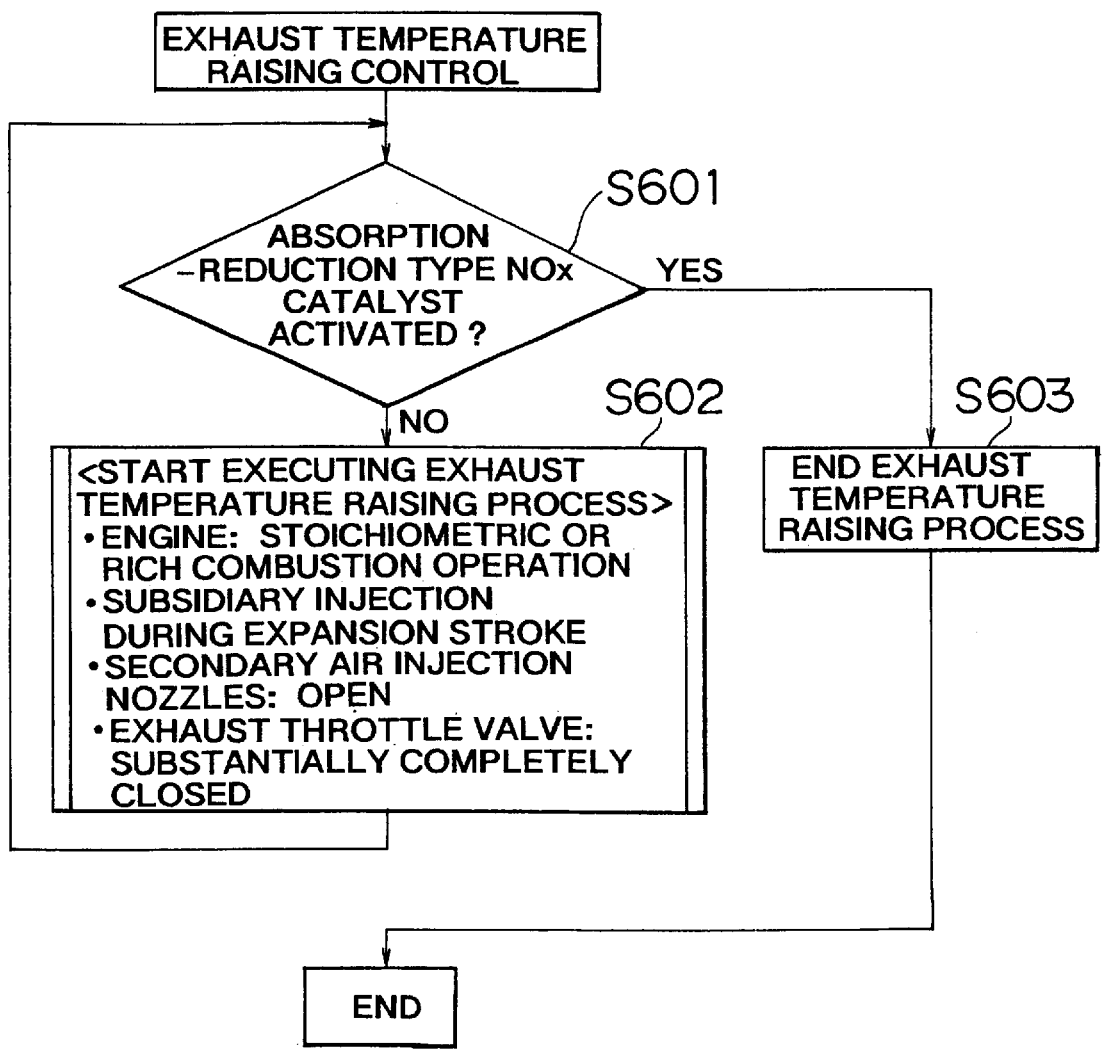
FIG. 6 is a flowchart illustrating an exhaust temperature raising control routine in the first embodiment.

To execute the exhaust temperature raising control, the CPU 201 executes an exhaust temperature raising control routine as illustrated in FIG. 6. This routine is pre-stored in the ROM 202. The execution of the routine is triggered by the completion of the starting of the engine 100.

In the exhaust temperature raising control routine, the CPU 201 first determines in step S601 whether the absorption-reduction type NOx catalyst device 46 is already activated.

If it is determined in step S601 that the absorption-reduction type NOx catalyst device 46 is not activated, the CPU 201 goes to S602, in which the CPU 201 starts executing the exhaust temperature raising process to reduce the amount of unburned HCs in exhaust gas and raise the temperature of exhaust gas.

More specifically, during the exhaust temperature raising process, the CPU 201 switches the operation state of the engine 100 to the homogeneous combustion operation based on a mixture of the theoretical air-fuel ratio or a rich air-fuel ratio, and controls the secondary air injection nozzles 53 so as to supply secondary air into the exhaust ports of the engine 100, and controls the fuel injection valves 32 so as to inject subsidiary fuel into each cylinder 21 during the expansion stroke, and controls the exhaust throttle actuator 50 so as to set the exhaust throttle valve 49 to the substantially completely closed state.

In this case, the subsidiary fuel injected into each cylinder 21 from the fuel injection valve 32 during the expansion stroke raises the temperature of exhaust gas being discharged from the combustion chamber 24 into the exhaust ports 27, and reduces the amount of unburned HCs remaining in exhaust gas.

Furthermore, since the exhaust throttle valve 49 is controlled to the substantially completely closed state, the pressure and the atmospheric temperature in the exhaust path from the combustion chambers 24 to the exhaust throttle valve 49 rise, and the flow rate of exhaust gas in the exhaust passage decreases.

As a result, the temperature decrease of exhaust gas at the time of discharge from the combustion chamber 24 of each cylinder 21 into the exhaust ports 27 is reduced, and secondary air and exhaust gas at a high temperature reside in the exhaust path for a long time. Therefore, the reactions of the relatively small amount of unburned HCs remaining in the exhaust gas with oxygen in the secondary air is promoted, so that the amount of unburned HCs contained in exhaust gas is considerably reduced.

Furthermore, when the reactions of unburned HCs with oxygen become active, the amount of heat produced by the reactions of unburned HCs with oxygen increases, so that the temperature of exhaust gas further rises. As the temperature of exhaust gas rises, the amount of heat transferred from exhaust gas to the absorption-reduction type NOx catalyst device 46 increases, so that the raise of the temperature of the absorption-reduction type NOx catalyst device 46 is accelerated.

The back pressure acting on the engine 100 becomes high since the exhaust throttle valve 49 is controlled to the substantially completely closed state. However, since the engine 100 is caused to operate in the homogeneous combustion operation mode based on a mixture of the theoretical air-fuel ratio or a rich air-fuel ratio, the operation state of the engine 100 does not become unstable.

Referring back to FIG. 3, after executing the above-described processing of step S602, the ECU 20 returns to step S601, in which the CPU 201 determines whether the absorption-reduction type NOx catalyst device 46 has been activated.

If it is determined that the absorption-reduction type NOx catalyst device 46 is not activated yet, the CPU 201 continues the exhaust temperature raising process of step S602. Conversely, if it is determined in step S601 that the absorption-reduction type NOx catalyst device 46 has been activated, the CPU 201 proceeds to step S603, in which the CPU 201 ends the execution of the exhaust temperature raising process. Subsequently, the CPU 201 ends the execution of the routine.

Thus, the CPU 201, executing the exhaust temperature raising control routine, is able to reliably reduce the amount of unburned HCs in exhaust gas and achieve quick activation of the absorption-reduction type NOx catalyst device 46 when a relatively large amount of unburned HCs is likely to be discharged from the engine 100 and the absorption-reduction type NOx catalyst device 46 is not activated.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. An exhaust temperature raising apparatus for an internal combustion engine, comprising:

an exhaust passage connected to the internal combustion engine;

an exhaust throttle valve that is provided in the exhaust passage and that adjusts an amount of flow of an exhaust gas flowing in the exhaust passage;

valve control means for controlling the exhaust throttle valve to a substantially completely closed state at a time when an amount of an unburned fuel component contained in the exhaust gas is to be reduced;

engine air-fuel ratio control means for operating the internal combustion engine at a theoretical air-fuel ratio or a fuel-excess air-fuel ratio when the exhaust throttle valve is controlled to the substantially completely closed state by the valve control means; and secondary air supply means for supplying a secondary air to an upstream portion of the exhaust passage when the exhaust throttle valve is controlled to the substantially completely closed state by the valve control means, wherein the time when the unburned fuel component contained in the exhaust gas is to be reduced is when the internal combustion engine is in a warm-up operation state following a cold start, wherein the internal combustion engine is a lean-burn direct-injection internal combustion engine that has fuel injection means for injecting a fuel directly into a cylinder and that is capable of switching between a stratified charge combustion operation and a homogeneous combustion operation, and wherein when the exhaust throttle valve is controlled to the substantially completely closed state by the valve control means, the engine air-fuel ratio control means causes the homogeneous combustion operation of the internal combustion engine and causes the fuel injection means to subsidiarily inject the fuel in addition to injection of a main amount of the fuel.

2. An exhaust temperature raising apparatus according to claim 1, further comprising an emission control catalyst device provided in a portion of the exhaust passage upstream of the exhaust throttle valve.

3. An exhaust temperature raising apparatus according to claim 2, wherein the emission control catalyst device is an absorption-reduction type NOx catalyst device.

4. An exhaust temperature raising apparatus according to claim 1, wherein the internal combustion engine is a lean-burn direct-injection internal combustion engine capable of burning an oxygen-excess mixture.

5. An exhaust temperature raising apparatus according to claims 1, further comprising an emission control catalyst device provided in a portion of the exhaust passage upstream of the exhaust throttle valve.

6. An exhaust temperature raising apparatus according to claim 5, wherein the emission control catalyst device is an absorption-reduction type NOx catalyst device.

7. An exhaust temperature raising method for an internal combustion engine; having an exhaust passage connected to the internal combustion engine, an exhaust throttle valve that is provided in the exhaust passage and that adjusts an amount of flow of an exhaust gas flowing in the exhaust passage, valve control means for controlling the exhaust throttle valve, engine air-fuel ratio control means for operating an air-fuel ratio of the internal combustion engine and secondary air supply means for supplying a secondary air to an upstream portion of the exhaust passage, wherein the internal combustion engine is a lean-burn direct-injection internal combustion engine that has fuel injection means for injecting a fuel directly into a cylinder and that is capable of switching between a stratified charge combustion operation and a homogeneous combustion operation, the method comprising the steps of:

controlling the exhaust throttle valve to a substantially completely closed state at a time when an amount of an unburned fuel component contained in the exhaust gas is to be reduced;

operating the internal combustion engine at a theoretical air-fuel ratio or a fuel-excess air-fuel ratio; and supplying a secondary air to an upstream portion of the exhaust passage, wherein the time when the unburned fuel component contained in the exhaust gas is to be reduced is when the internal combustion engine is in a warm-up operation state following a cold start, and wherein when the exhaust throttle valve is controlled to the substantially completely closed state by the valve control means, the engine air-fuel ratio control means causes the homogeneous combustion operation of the internal combustion engine and causes to subsidiarily inject the fuel in addition to injection of a main amount of the fuel.

* * * * *